(No Model.)

I. P. WENDELL.
BEARING FOR CAR AXLES.

No. 280,978.  Patented July 10, 1883.

WITNESSES:

INVENTOR
Isaac P. Wendell
By S. J. Van Stavoren
ATTORNEY

UNITED STATES PATENT OFFICE.

ISAAC P. WENDELL, OF PHILADELPHIA, PENNSYLVANIA.

BEARING FOR CAR-AXLES.

SPECIFICATION forming part of Letters Patent No. 280,978, dated July 10, 1883.

Application filed November 23, 1882. (No model.)

*To all whom it may concern:*

Be it known that I, ISAAC P. WENDELL, a citizen of the United States, residing at Philadelphia, in the county of Philadelphia and State of Pennsylvania, have invented certain new and useful Improvements in Car-Axle Brasses, of which the following is a specification, reference being had therein to the accompanying drawings, wherein—

Figure 1:
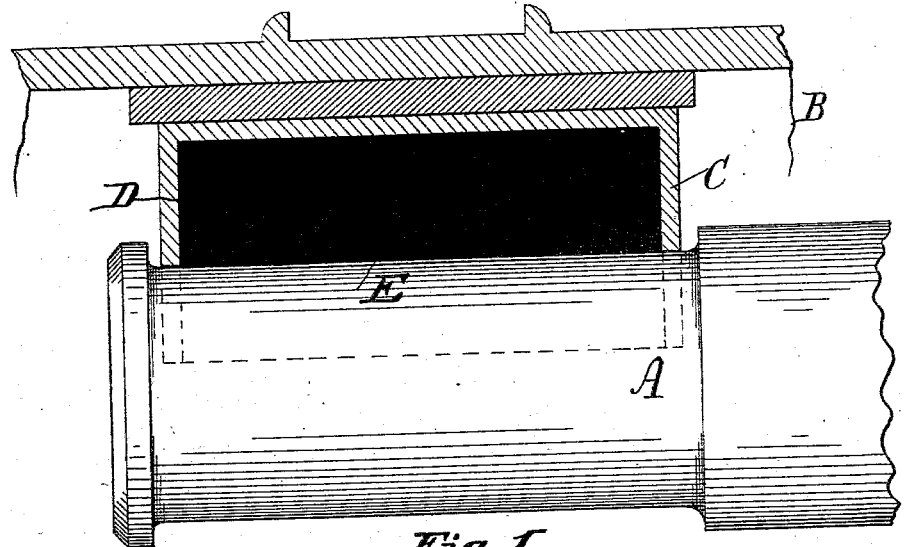
Figure 2:
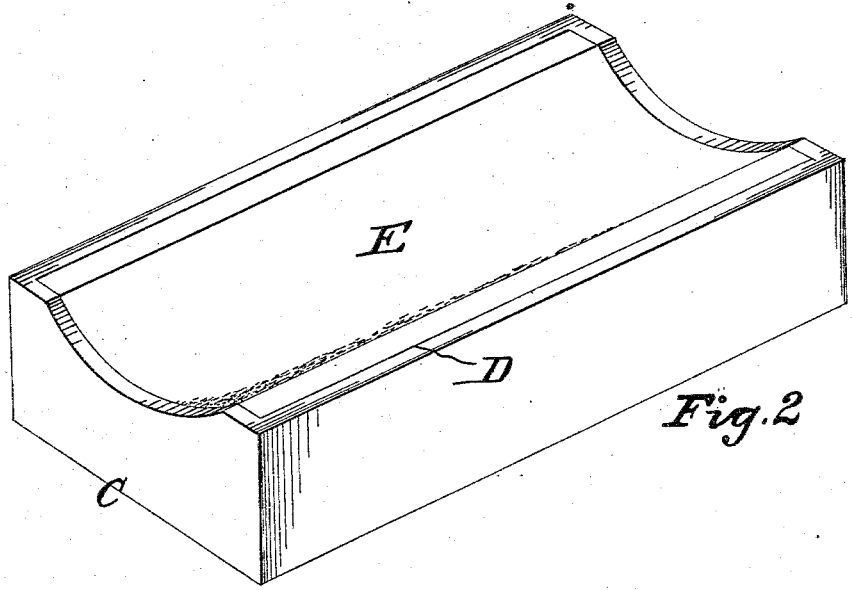

Figure 1 is a sectional view of a part of a car-axle box and axle with my improved brass or bearing; and Fig. 2 is a perspective of the bearing in an inverted position.

My invention has relation to brasses or bearings for car-axles, and has for its object to provide a brass or bearing which will not readily heat, which is extremely durable, and which requires but a minimum amount of lubrication for preventing undue friction between it and the axle-journal.

My invention consists of a brass or bearing which is formed of a metallic box or frame and a packing composed of a non-combustible material combined with silicate of soda or equivalent substance.

Referring to the accompanying drawings, A represents a car-axle journal; B, the upper portion of a car-axle box, and C the brass or bearing for the journal. Said brass is composed of a metal frame or box, D, filled with a packing, E. The frame D may be of brass, steel, malleable or cast iron, or other suitable metal, and of any desired configuration and size. The packing E is composed of a mixture of silicate of soda, or equivalent substance, and asbestus or black-lead, or talc, or soapstone, or other suitable non-combustible material. The mixture I prefer to use is silicate of soda and asbestus. These materials are commingled together until a plastic mass is formed, which is then placed in the box or frame D and subjected to a heavy pressure to compress the same into a solid or composite body. A bearing so formed has a hard smooth or glassy surface, due to the silicate of soda, which also causes the particles of asbestus to adhere together in a compact mass. The asbestus being an incombustible material, it will not readily heat nor wear away, and being in itself a lubricant to a greater or less degree, it follows that said bearing will not require as much oil to effect a smooth running of the journal as is necessary to use with the journals as now constructed.

What I claim is—

1. A brass or bearing composed of a frame or box and a packing of asbestus and silicate of soda, substantially as shown and described.

2. The combination of box or frame D and the packing E, composed of asbestus and silicate of soda, substantially as shown and described.

In testimony whereof I affix my signature in presence of two witnesses.

ISAAC P. WENDELL.

Witnesses:
 S. J. VAN STAVOREN,
 CHAS. F. VAN HORN.